W. H. BRIGGS.
Horse-Collar.

No. 206,219. Patented July 23, 1878.

Attest: Stephen H. Woolworth
Laban W. Garner

Inventor: William Henry Briggs.

UNITED STATES PATENT OFFICE.

WILLIAM HENRY BRIGGS, OF LEMARS, IOWA.

IMPROVEMENT IN HORSE-COLLARS.

Specification forming part of Letters Patent No. 206,219, dated July 23, 1878; application filed March 14, 1878.

*To all whom it may concern:*

Be it known that I, WILLIAM HENRY BRIGGS, of Lemars, in the county of Plymouth and State of Iowa, have invented a Horse-Collar, of which the following is a description:

My invention is an improvement in collars for horses; and has for its object to provide a collar that will be easy of adjustment and simple of construction, and having advantages favorable to the animal, as will be hereinafter explained.

It consists of a collar formed of two sections, each having the most approved form to fit the neck and shoulders of the animal.

The large ends are finished with stitching to confine the filling to its proper place. The upper ends of the two sections are finished like the lower, and are secured together by a strip of leather, which is stitched to said ends to form a permanent union. A pad formed to suit the neck of the animal is stitched to the strip, which unites the two sections together.

Figure 1:
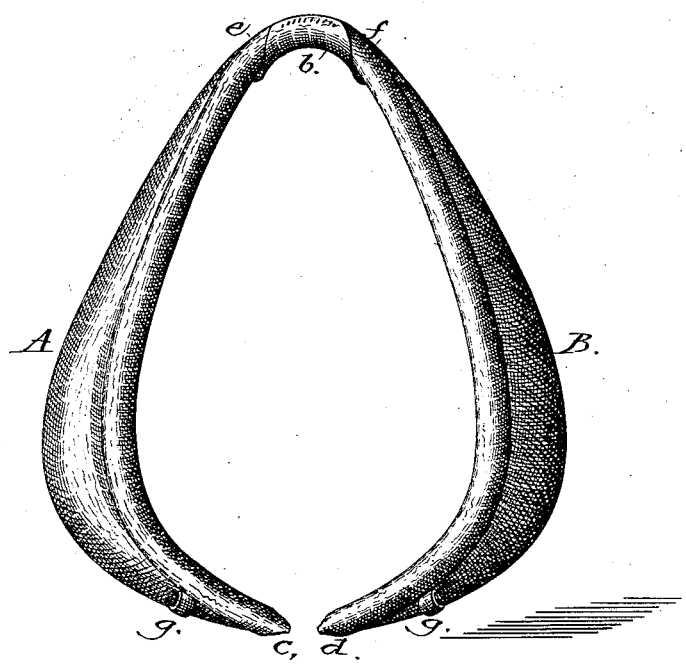
Figure 2:
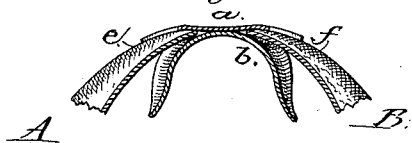

In my drawings, Figure 1 is an elevation of my collar. Fig. 2 is a sectional view, showing the manner of uniting the two sections.

Similar reference-letters indicate like parts.

Referring to the drawings, A B are the two sections, finished at their tops and bottoms *e f c d* as described. The upper ends are secured together permanently by the flexible strip *a*, of leather or other suitable material, by stitching. *b* is the pad, fashioned to suit the neck of the animal, and secured fast to the strip *a*. Near the lower ends of the two sections A B are loops *g*, to receive the ends of the hames, to prevent them slipping away from the collar should the strap which secures them become loose.

The advantages of the collar are, that it will be easy to put on, requiring only to be thrown over the horse's neck. Being open at the bottom, there will be no danger of the horse choking. It will be more durable, as common collars are liable to break at the bottom.

The main purpose of the invention is that, the collar being more flexible at top and bottom (when secured by the hame-strap,) the opposite sides of the collar will adjust themselves to the movements of the horse and protect the shoulders from unequal strain, and save the horse's shoulders from being galled.

What I claim is—

In a horse-collar, the sections A B, secured at their tops by strips *a*, and provided at their bottoms with loops *g*, to receive the ends of the hames, said collar being secured about the neck of the animal by the straps which fasten the hames at the bottom, as and for the purpose set forth.

WILLIAM HENRY BRIGGS.

Witnesses:
STEPHEN H. WOOLWORTH,
LABAN M. GARNER.